(12) United States Patent
Matsui et al.

(10) Patent No.: US 10,466,347 B2
(45) Date of Patent: Nov. 5, 2019

(54) RADAR DEVICE AND METHOD OF DETERMINING PHASE DIFFERENCE FOLDING

(71) Applicant: FUJITSU TEN LIMITED, Kobe-shi, Hyogo (JP)

(72) Inventors: Isao Matsui, Kobe (JP); Kenji Oka, Kobe (JP); Yasuhiro Kurono, Kobe (JP)

(73) Assignee: FUJITSU TEN Limited, Kobe (JP)

( * ) Notice: Subject to any disclaimer, the term of this patent is extended or adjusted under 35 U.S.C. 154(b) by 275 days.

(21) Appl. No.: 15/473,061

(22) Filed: Mar. 29, 2017

(65) Prior Publication Data

US 2017/0307745 A1 Oct. 26, 2017

(30) Foreign Application Priority Data

Apr. 21, 2016 (JP) ................... 2016-085353

(51) Int. Cl.
*G01S 13/38* (2006.01)
*G01S 13/44* (2006.01)

(52) U.S. Cl.
CPC .......... *G01S 13/38* (2013.01); *G01S 13/4454* (2013.01)

(58) Field of Classification Search
CPC ................... G01S 13/38; G01S 13/931; G01S 2013/9375; G01S 13/345; G01S 13/348; G01S 13/44; G01S 13/48; G01S 13/5244; G01S 13/72; G01S 7/4004; G01S 7/4021; G01S 13/04; G01S 13/4454; G01S 13/584; G01S 13/75; G01S 13/886; G01S 3/48

USPC .......................................................... 342/102
See application file for complete search history.

(56) References Cited

U.S. PATENT DOCUMENTS

| | | | |
|---|---|---|---|
| 2006/0028375 A1* | 2/2006 | Honda ................ | G01S 13/4454 342/70 |
| 2006/0132353 A1* | 6/2006 | Natsume ............. | G01S 13/4463 342/147 |
| 2010/0225523 A1* | 9/2010 | Mizutani ................... | G01S 3/48 342/83 |
| 2015/0057833 A1* | 2/2015 | Moriuchi .................. | G01S 7/03 701/1 |
| 2017/0242116 A1* | 8/2017 | Kishigami ............ | G01S 7/2925 |

FOREIGN PATENT DOCUMENTS

| | | |
|---|---|---|
| JP | 2000-230974 A | 8/2000 |
| JP | 2015-68724 A | 4/2015 |

\* cited by examiner

*Primary Examiner* — Timothy X Pham
(74) *Attorney, Agent, or Firm* — Oliff PLC (57) ABSTRACT

There is provided a radar device. A transmission unit includes a transmission antenna for transmitting a signal of a first frequency and a signal of a second frequency. A reception unit includes a first receiving antenna and a second receiving antenna for receiving a first signal obtained by bouncing the signal of the first frequency off a target, and a second signal obtained by bouncing the signal of the second frequency off the target. A control unit determines folding of a first phase difference, based on the first phase difference between the first signal received by the first receiving antenna and the first signal received by the second receiving antenna, a second phase difference between the second signal received by the first receiving antenna and the second signal received by the second receiving antenna, and a difference between the first phase difference and the second phase difference.

2 Claims, 7 Drawing Sheets

RADAR DEVICE AND METHOD OF DETERMINING PHASE DIFFERENCE FOLDING

CROSS-REFERENCE TO RELATED APPLICATIONS

This application is based on and claims priority from Japanese Patent Application No. 2016-085353 filed on Apr. 21, 2016.

TECHNICAL FIELD

The disclosure relates to a radar device and a method of determining phase difference folding.

BACKGROUND

A radar device configured to detect a target has been known. The radar device is configured to transmit and receive frequency-modulated electromagnetic waves, thereby estimating a distance from the radar device to the target having reflected the electromagnetic waves, a speed of the target relative to the radar device and a target direction (angle) from the radar device.

The radar device is configured to receive the electromagnetic waves reflected on the target at a plurality of receiving antennas. The radar device can calculate the target direction (an arrival direction of the electromagnetic wave) by a phase difference of the reflected waves (reflected electromagnetic waves) received by the two adjacent antennas. The phase difference is generated due to a difference of path lengths (path length difference) from the target to the respective antennas.

When the two adjacent receiving antennas are distant from each other by a half wavelength or longer of the electromagnetic waves to be received, a case may occur in which a phase difference of reflected waves from the same target, which are to be received by the two receiving antennas, is 360° ($2\pi$rad) or greater in a detection region from −90° to +90°. Since $\sin(\alpha)=\sin(\alpha+360°)$, the radar device cannot distinguish a phase difference $\alpha$ (−180°<$\alpha$≤180°) from a phase difference $\alpha+360°$, for example. For this reason, it is not possible to estimate the target direction as one only by the phase difference. Also, when an interval between the receiving antennas is narrowed, the phase difference is within a range from −180° to +180° but antenna characteristics are deteriorated.

Figure 1:
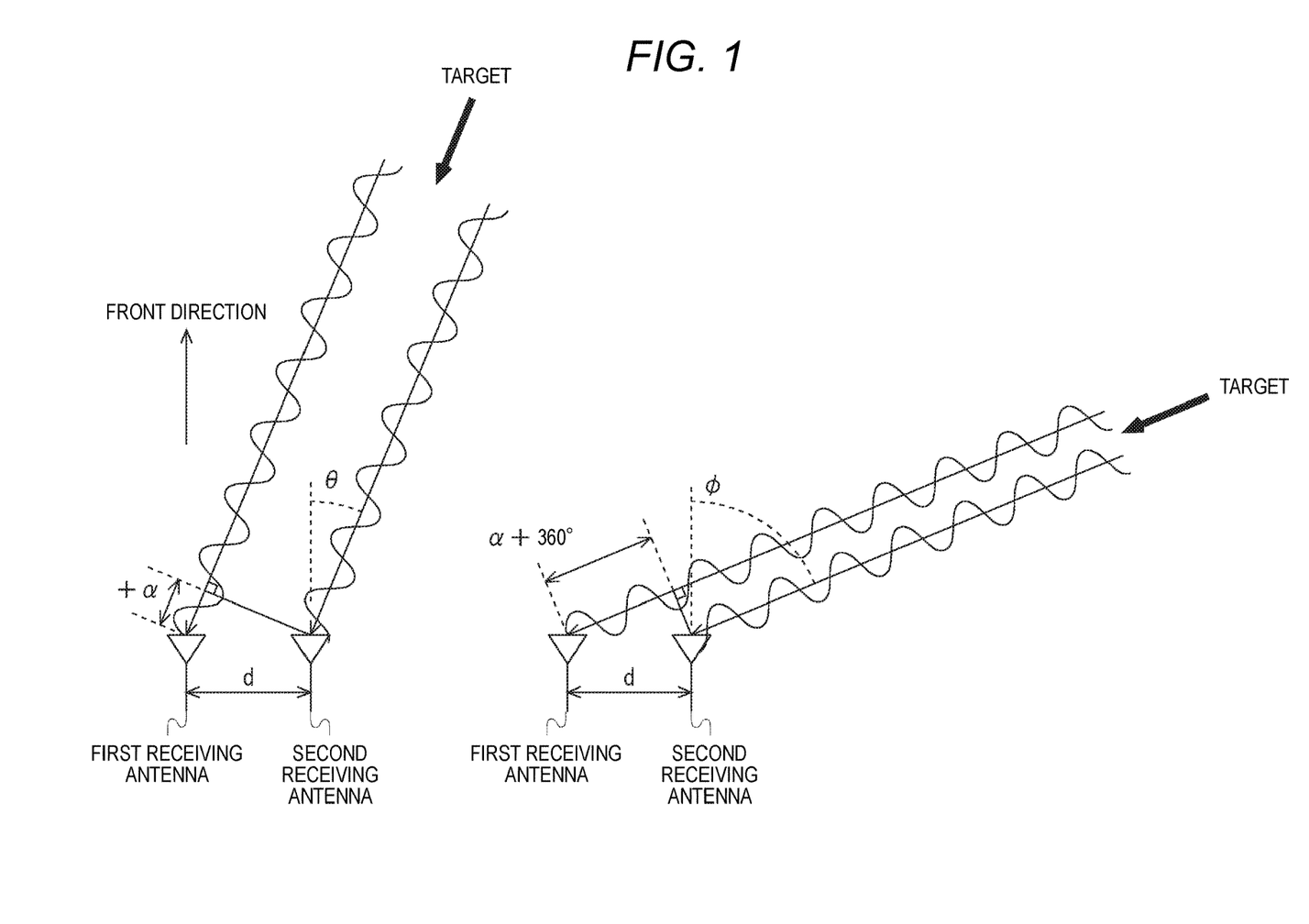
FIG. 1 depicts examples of a phase difference when targets exist in different directions from a radar device.

FIG. 1 depicts an example of the phase difference when targets are at different directions from a radar device. In FIG. 1 a first receiving antenna and a second receiving antenna, which are receiving antennas of the radar device, are shown. An interval between the first receiving antenna and the second receiving antenna is d. At a left side of FIG. 1, the first receiving antenna and the second receiving antenna receive reflected waves from a target existing in a direction in which an angle to a front direction of the radar device is $\theta$. The interval d between the antennas is greater than a wavelength of the reflected wave. At the left side of FIG. 1, it is assumed that a phase difference of the reflected waves to be received at the first receiving antenna and the second receiving antenna is $\alpha$(−180<$\alpha$≤180°). At a right side of FIG. 1, the first receiving antenna and the second receiving antenna, which are the same as the left side, receive reflected waves from a target existing in a direction in which the angle to the front direction of the radar device is $\phi$ (>$\theta$). At the right side of FIG. 1, it is assumed that a phase difference of the reflected waves to be received at the first receiving antenna and the second receiving antenna is $\alpha+360°$. Herein, since the radar device cannot distinguish the phase difference $\alpha$ from the phase difference $\alpha+360°$, it is not possible to estimate whether the target direction is the direction of $\theta$ or $\phi$ only by the phase difference.

Therefore, a technology of transmitting electromagnetic waves from a plurality of antennas (for example, a first transmission antenna and a second transmission antenna) of a radar device and estimating a target direction on the basis of a target direction estimated from a phase difference and receiving levels with respect to the respective transmission antennas has been known. That is, when a target exists in a direction corresponding to the phase difference $\alpha$ and when a target exists in a direction corresponding to the phase difference $\alpha+360°$, level differences between a received signal of a signal by the first transmission antenna and a received signal of a signal by the second transmission antenna are different. By using the corresponding characteristic, a receiving level difference is calculated with respect to an estimated direction, so that it is possible to determine whether the target direction is the direction corresponding to the phase difference $\alpha$ or the phase difference $\alpha+360°$.

Patent Document 1: Japanese Patent Application Publication No. 2015-068724A

However, when a detection direction range of the target in the radar device is expanded, the receiving level at the receiving antenna is lowered in the vicinity of a boundary of the detection direction range. When the receiving level is lowered, the level difference is reduced, so that it is difficult to estimate the target direction by using the level difference. Also, since the plurality of transmission antennas is used so as to estimate the target direction with the receiving level difference, a configuration of the radar device becomes complicated.

SUMMARY

It is therefore an object of the disclosure to provide a device configured to estimate an arrival direction of a signal with high precision.

The disclosure adopts following configurations so as to achieve the above object. There is provided a radar device comprising: a transmission unit comprising a transmission antenna which is configured to transmit a signal of a first frequency and a signal of a second frequency different from the first frequency; a reception unit comprising a first receiving antenna and a second receiving antenna which are configured to receive a first signal obtained by bouncing the signal of the first frequency off a target, and a second signal obtained by bouncing the signal of the second frequency off the target; and a control unit configured to determine folding of a first phase difference, based on the first phase difference between the first signal received by the first receiving antenna and the first signal received by the second receiving antenna, a second phase difference between the second signal received by the first receiving antenna and the second signal received by the second receiving antenna, and a difference between the first phase difference and the second phase difference.

The disclosed aspect may also be implemented as a program is executed by the information processing device. That is, the disclosed configuration may be specified as a program for enabling the information processing device to execute the processing, which is to be executed by each unit in the above aspect, or as a computer-readable recording medium having the program recorded therein. Also, the disclosed configuration may be specified by a method in which the information processing device is to execute the processing, which is to be executed by each unit. The disclosed configuration may also be specified as a system including the information processing device configured to execute the processing, which is to be executed by each unit.

Steps of describing the program include not only processing that is to be executed in time sequence in accordance with the described sequence but also processing that is to be executed in parallel or individually even though it is not executed in time sequence. Some of the steps of describing the program may be omitted.

According to the disclosure, it is possible to provide the device configured to estimate the arrival direction of the signal with high precision.

BRIEF DESCRIPTION OF THE DRAWINGS

Exemplary embodiments of the present invention will be described in detailed based on the following figures, wherein.

DETAILED DESCRIPTION

Hereinafter, an illustrative embodiment will be described with reference to the drawings. A configuration of the illustrative embodiment is just exemplary, and the disclosure is not limited to the specific configuration of the disclosed illustrative embodiment. When implementing the disclosure, a specific configuration corresponding to the illustrative embodiment may be appropriately adopted.

[Illustrative Embodiment]

(Configuration Example)

Figure 2:
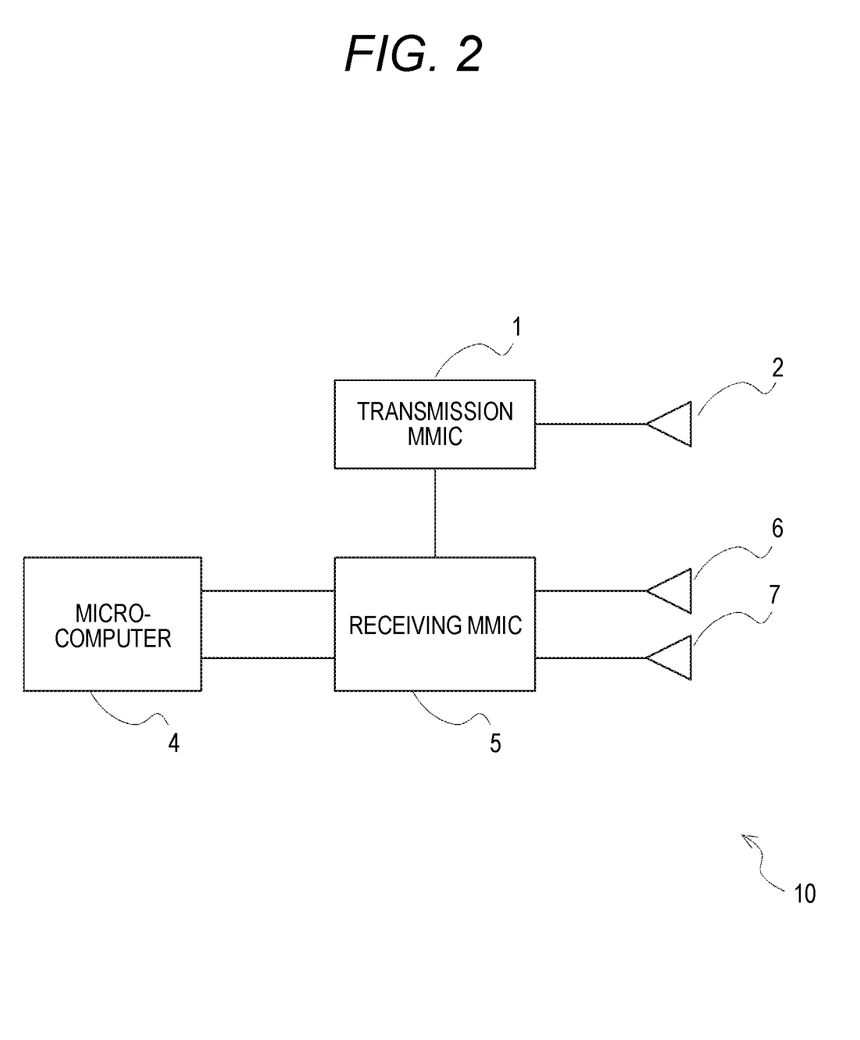
FIG. 2 depicts a configuration example of a radar device in accordance with an illustrative embodiment.

FIG. 2 depicts a configuration example of a radar device in accordance with an illustrative embodiment. A radar device 10 of FIG. 2 includes a transmission MMIC (Monolithic Microwave Integrated Circuit) 1, a transmission antenna 2, a control unit 4, a receiving MMIC 5, a first receiving antenna 6 and a second receiving antenna 7. The transmission MMIC 1 and the transmission antenna 2 are examples of the transmission unit. The receiving MMIC 5, the first receiving antenna 6 and the second receiving antenna 7 are examples of the reception unit.

Based on a control signal from the control unit 4 of the radar device 10, the transmission MMIC 1 is enabled to operate and a frequency-modulated transmission radio wave is output from the transmission antenna 2. Radio waves reflected on a target are respectively received at the first receiving antenna 6 and the second receiving antenna 7.

The radar device 10 is mounted on a vehicle, for example, and can be used to detect a target around the vehicle, such as another vehicle, a sign, a guardrail and the like. A detection result of the target is output to a storage device, an ECU (Electrical Control Unit) and the like of the vehicle, and can be used for vehicle control of a PCS (Pre-crash Safety System) or the like. In the meantime, the radar device 1 of the illustrative embodiment can also be used for a variety of utilities (for example, a utility for monitoring an in-flight airplane, an underway ship or the like), except for the in-vehicle radar device.

The transmission MMIC 1 is configured to generate electromagnetic waves of a predetermined frequency, based on an instruction from the control unit 4. The MMIC is a monolithic microwave integrated circuit configured to perform signal processing such as oscillation, amplification, modulation, frequency conversion and the like of a microwave signal. Herein, a frequency of the electromagnetic wave to be generated is a microwave of about 76 GHz. However, the frequency of the electromagnetic wave is not limited thereto. The transmission MMIC 1 is configured to generate electromagnetic waves of at least two frequencies.

Herein, the transmission MMIC 1 may be configured to generate the electromagnetic waves in an FCM (Fast Chirp Modulation) method. The FCM method is a method of using a chirp wave of which a frequency continuously increases or decreases, as the transmission signal, and executing two-dimensional FFT for a beat signal, which is to be generated from the transmission signal and the received signal, to measure a distance and a speed. Also, the transmission MMIC 1 may be configured to generate the electromagnetic waves in an FMCW method.

The transmission antenna 2 is configured to transmit the electromagnetic wave generated at the transmission MMIC 4. The electromagnetic waves transmitted from the transmission antenna 2 are reflected on an object around the radar device 10 and are then received at the first receiving antenna 6 and the second receiving antenna 7.

The control unit 4 is configured to control the radar device 10. The control unit 4 is configured to instruct generation of the transmission signal of the predetermined frequency. Also, the control unit 4 is configured to execute calculation processing for the received signal. The control unit 4 includes a processor configured to execute calculation processing of a signal in accordance with a computer program, a memory configured to store therein information about the calculation processing, and the like. The control unit 4 is not limited to a configuration where a universal processor is implemented on the basis of a computer program (software). For example, all or some of the control unit may be implemented by a dedicated calculation circuit (hardware) arranged at an inside or an outside of the processor. In the memory, a calculation equation and a value, which are to be used in the calculation, a calculation result and the like are stored.

The receiving MMIC 5 is configured to perform predetermined processing for the electromagnetic waves received at the first receiving antenna 6 and the second receiving antenna 7. The receiving MMIC 5 is configured to generate beat signals by mixing the electromagnetic waves (received waves) received at the respective antennas and the transmission waves and taking absolute values of differences between the transmission waves and the received waves.

The first receiving antenna 6 and the second receiving antenna 7 are configured to receive the electromagnetic waves transmitted from the transmission antenna 2 and reflected around the radar device 10. The number of the receiving antennas is not limited to two and may be two or more.

(Operation Example)

An operation example of the radar device 10 of the illustrative embodiment is described. Herein, the radar device 10 transmits the chirp waves of FCM, receives the reflected waves reflected on the target at the respective receiving antennas, and generates the beat signals. The radar device 10 performs the FFT calculation to generate a power spectrum, in a high frequency region of the chirp wave and a low frequency region of the chirp wave in the beat signal. The radar device 10 extracts peaks of a predetermined threshold value or greater from the power spectrum. The peak corresponds to the target around the radar device 10. The radar device 10 calculates a phase difference at the first receiving antenna 6 and a phase difference at the second receiving antenna 7, for each peak. The radar device 10 calculates a phase difference between the first receiving antenna 6 and the second receiving antenna 7 in the high frequency region and the low frequency region, respectively. Also, the radar device 10 determines phase folding by a difference between the phase difference in the high frequency region and the phase difference in the low frequency region. The transmission signal used herein may be a transmission signal of FMCW, instead of the transmission signal of FCM.

the radar device 10 generates the transmission waves (chirp waves) at the transmission MMIC 1 and transmits the same through the transmission antenna 2. The chirp wave is an electromagnetic wave of which a frequency continuously increases or decreases. The transmission waves transmitted from the transmission antenna 2 are reflected by the target around the radar device 10. The radar device 10 receives the electromagnetic waves (reflected waves) reflected on the target at the first receiving antenna 6 and the second receiving antenna 7. The receiving MMIC 5 mixes the reflected waves received at each receiving antenna with the transmission waves and generates the beat signals. The receiving MMIC 5 AD (Analog to Digital) converts the beat signals and outputs the converted signals to the control unit 4.

Figure 3:
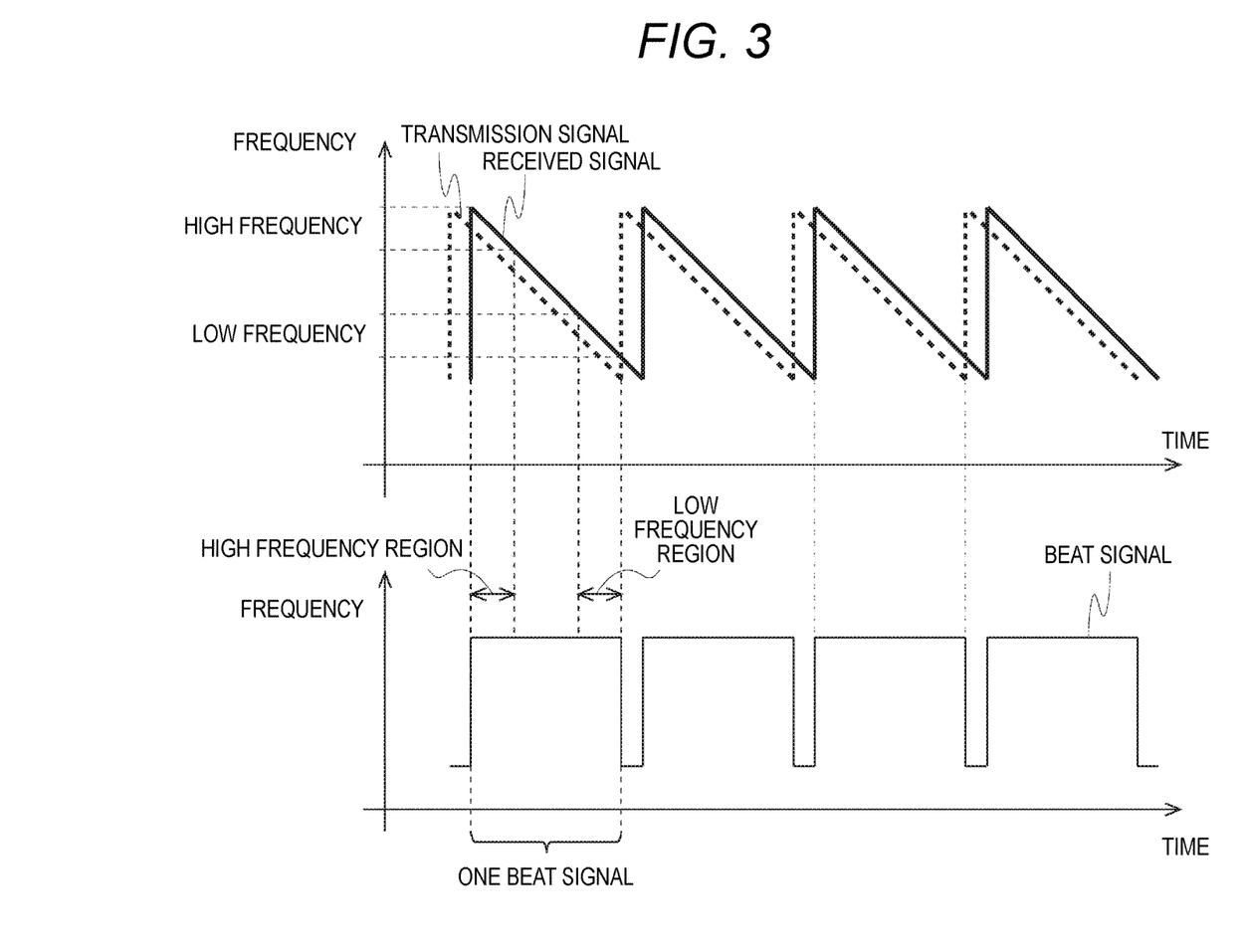
FIG. 3 depicts examples of a transmission signal, a received signal and a beat signal of the radar device.

FIG. 3 depicts examples of the transmission signal, the received signal and the beat signal in the radar device. In an upper graph of FIG. 3, a horizontal axis indicates time and a vertical axis indicates a transmission frequency or a receiving frequency. In the upper graph of FIG. 3, a saw-tooth wave shown with a solid dotted line indicates a temporal change of the frequency of the transmission signal, and a saw-tooth wave shown with a solid line indicates a temporal change of the frequency of the received signal. The transmission signal is a chirp wave of which a frequency continuously decreases. The received signal is a signal obtained by the reflected wave of the transmission signal from the target. The received signal is received with being delayed from the transmission signal, in correspondence to a distance to the target. A lower graph of FIG. 3 indicates a temporal change of the beat signal obtained by mixing the transmission signal and the received signal. Since the transmission signal is the chirp wave of which the frequency continuously decreases, a left part of one beat signal is a beat signal by the high frequency region, and a right part is a beat signal by the low frequency region. Herein, a high-low level of the frequency indicates whether the frequency is higher or lower than an average of a frequency range of the received signal (a frequency range of the chirp wave).

Figure 4:
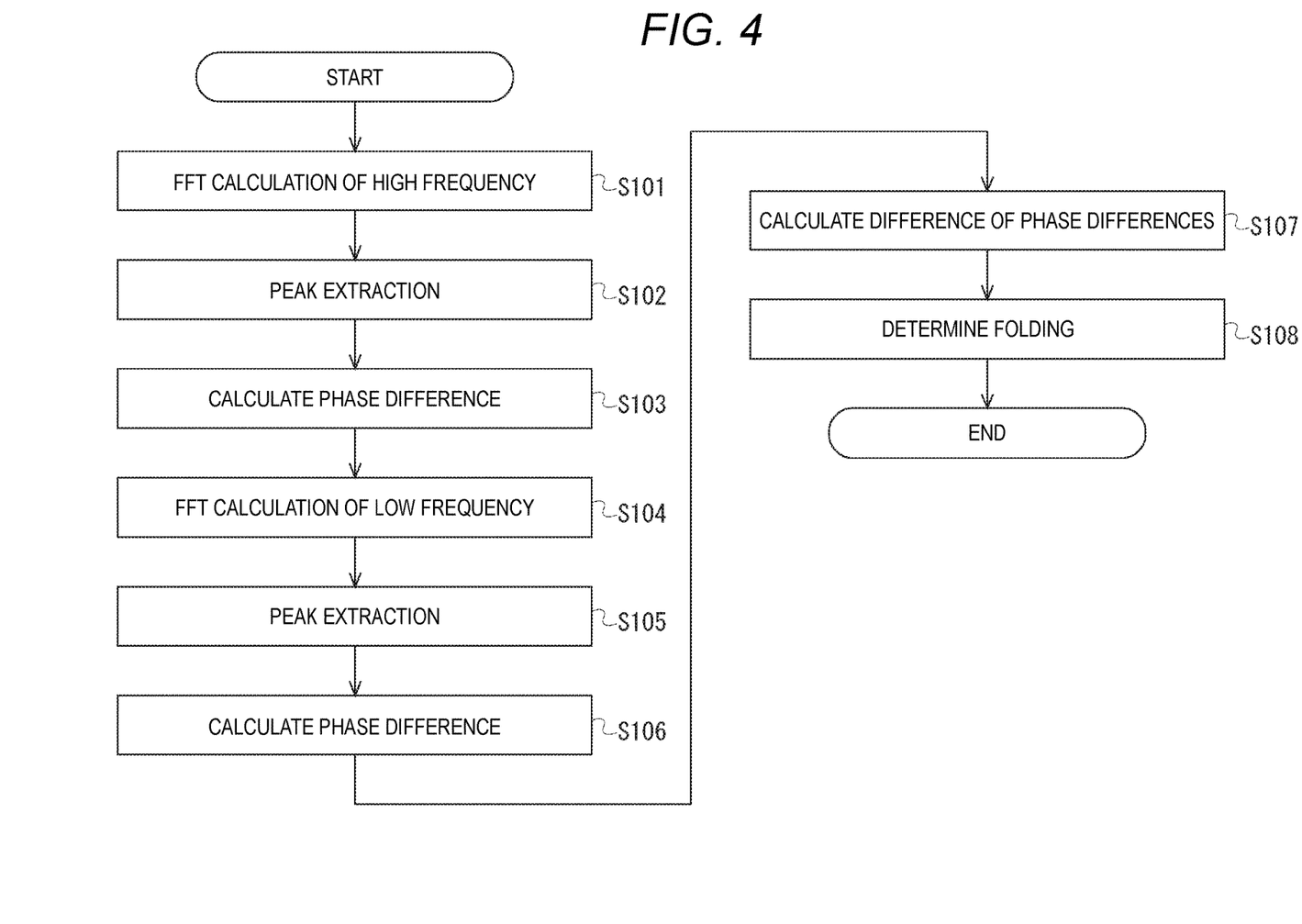
FIG. 4 depicts an example of an operation flow of phase folding determination in a control unit.

FIG. 4 depicts an example of an operation flow of phase folding determination in the control unit. The operation flow of FIG. 4 starts when the control unit 4 receives from the receiving MMIC 5 the beat signals obtained from the reflected waves received at each receiving antenna.

In S101, the control unit 4 performs the FFT calculation for the high frequency regions of the chirp waves of the received beat signals and generates the power spectrum. A width of the high frequency region can be set as a 20% region of one beat signal from a high frequency-side end, for example. In this case, a width of the low frequency region is also set as a 20% region of one beat signal from a low frequency-side end. However, the ratio is not limited to 20%. When the ratio is set greater, an amount of data that can be used in the calculation increases but a difference of phase differences that is to be later calculated decreases. On the other hand, when the ratio is set smaller, the amount of data that can be used in the calculation decreases but the difference of the phase differences increases. When the amount of data that can be used in the calculation increases, a computational noise is reduced. On the other hand, when the difference of the phase differences increases, it is possible to easily determine the phase folding. Therefore, the ratio is appropriately determined, in consideration of the magnitude of the noise and the easiness of the phase folding determination. The control unit 4 generates the power spectrum for each receiving antenna.

In S102, the control unit 4 extracts peaks of a predetermined threshold value or greater from the generated power spectrum. Each peak corresponds to the target. The control unit 4 calculates a phase difference of each peak. The phase difference that is to be calculated herein is a phase difference between the transmission signal and the signal received at each receiving antenna.

In S103, the control unit 4 calculates a phase difference between the receiving antennas. The control unit 4 calculates the phase difference between the receiving antennas with respect to the phase difference of each peak calculated in S102. That is, in one peak, a difference between the phase difference for the first receiving antenna 6 and the phase difference for the second receiving antenna 7 is the phase difference between the receiving antennas.

In S104, the control unit 4 performs the FFT calculation for the low frequency regions of the chirp waves of the received beat signals and generates a power spectrum. A ratio of a width of the low frequency region to a width of the beat signal is the same as the ratio of the width of the high frequency region to the width of the beat signal in S101. The control unit 4 generates the power spectrum for each receiving antenna.

In S105, the control unit 4 extracts peaks of a predetermined threshold value or greater from the generated power spectrum. Each peak corresponds to the target. The control unit 4 calculates a phase difference of each peak. The phase difference that is to be calculated herein is a phase difference between the transmission signal and the signal received at each receiving antenna.

In S106, the control unit 4 calculates a phase difference between the receiving antennas. The control unit 4 calculates the phase difference between the receiving antennas with respect to the phase difference of each peak calculated in S102. That is, in one peak, a difference between the phase difference for the first receiving antenna 6 and the phase difference for the second receiving antenna 7 is the phase difference between the receiving antennas.

Thereby, for each peak, the phase differences between the receiving antennas in the high frequency regions of the chirp waves of the beat signals and the phase differences between the receiving antennas in the low frequency regions of the chirp waves of the beat signals are calculated.

In S107, the control unit 4 calculates a difference of the phase differences. The control unit 4 calculates a difference between the phase difference in the high frequency region of the chirp wave calculated in S103 and the phase difference in the low frequency region of the chirp wave calculated in S106, for each peak.

Figure 5:
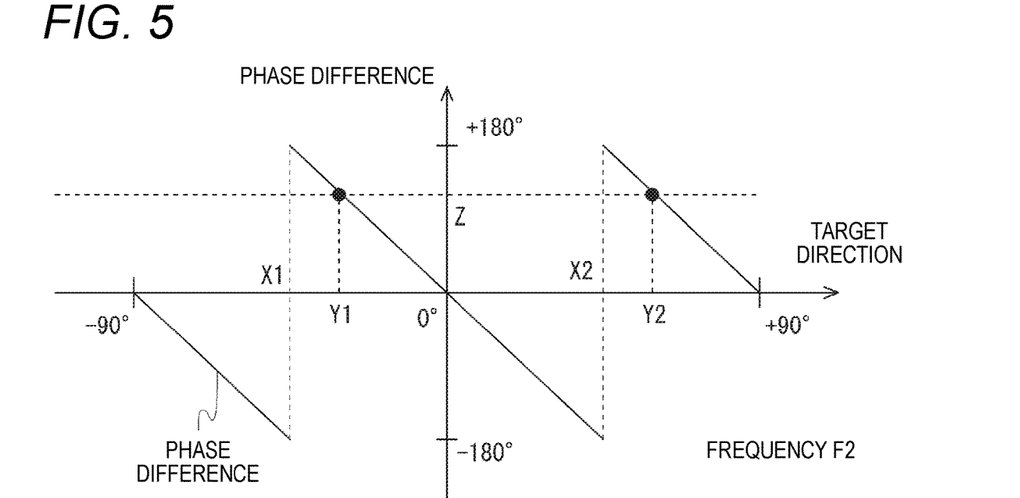
FIG. 5 depicts an example (1) of folding of a phase difference.

FIG. 5 depicts an example (1) of folding of the phase difference. In a graph of FIG. 5, a horizontal axis indicates a target direction from the radar device 10 and a vertical axis indicates a phase difference between the received signal at the first receiving antenna and the received signal at the second receiving antenna from the target. When a distance between the two receiving antennas is longer than a wavelength of the signal, a difference between path lengths from the target to the receiving antennas may be the wavelength or greater. When the path length difference is the wavelength or greater, the phase difference of the received signals may exceed a range from −180° to +180°. When the phase difference exceeds the range, it is not possible to distinguish the phase difference from a phase difference within the range. The phenomenon that the phase difference exceeds the range is referred to as 'phase difference is folded.' When the phase difference is folded, an apparent phase difference is within a range from −180° to +180° by adding +360° or −360° to the phase difference. In the graph of FIG. 5, the phase difference is folded at angles X1 and X2 in the target direction. For this reason, it is not possible to distinguish whether the target direction is at an angle Y1 or an angle Y2, at an apparent phase difference Z.

Figure 6:
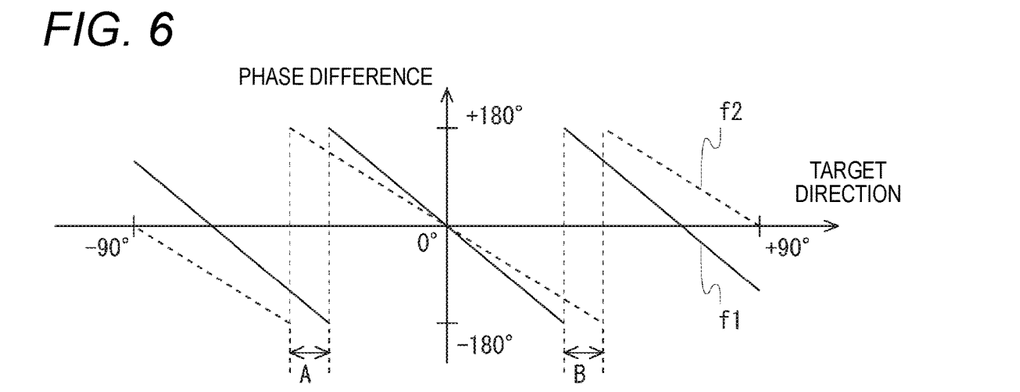
FIG. 6 depicts an example (2) of the folding of the phase difference.

FIG. 6 depicts an example (2) of the folding of the phase difference. In a graph of FIG. 6, a horizontal axis indicates a target direction from the radar device 10 and a vertical axis indicates a phase difference between the received signal at the first receiving antenna and the received signal at the second receiving antenna from the target. Herein, examples where the frequency of the transmission signal (received signal) is f1 and f2 are shown (f1>f2). For example, an average frequency (central frequency) of the high frequency region is referred to as f1 and an average frequency (central frequency) of the low frequency region is referred to as f2. When the frequencies of the transmission signal are different, the phase differences between the receiving antennas are also different. Meanwhile, in the graph of FIG. 5, the frequency of the transmission signal is the same as the frequency f2 of FIG. 6.

Figure 7:
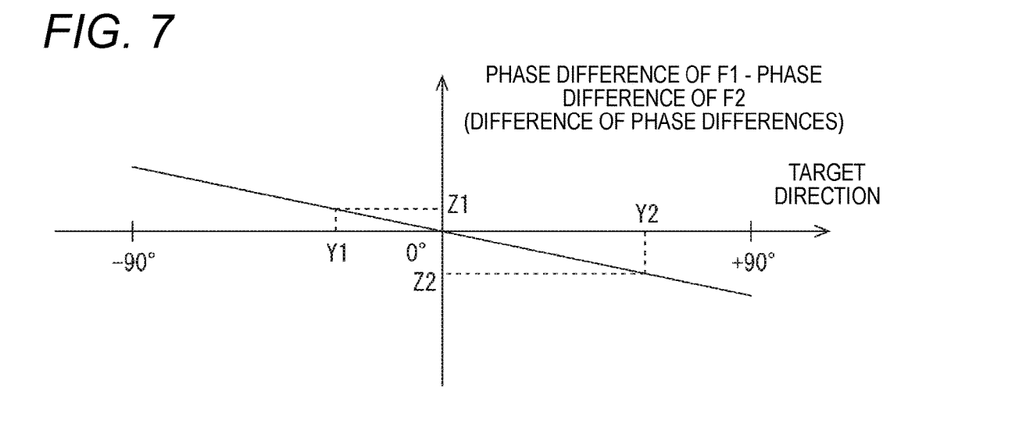
FIG. 7 depicts an example of a difference of phase differences.

FIG. 7 depicts an example of the difference of the phase differences. In a graph of FIG. 7, a horizontal axis indicates the target direction from the radar device 10, and a vertical axis indicates the difference of the phase differences. Herein, the difference of the phase differences is a difference between the phase difference between the received signal of the first receiving antenna and the received signal of the second receiving antenna having the frequency f1 of the graph of FIG. 6 and the phase difference between the received signal of the first receiving antenna and the received signal of the second receiving antenna having the frequency f2. In the example of the graph of FIG. 7, the difference of the phase differences is Z1 at the angle Y1 in the target direction and the difference of the phase differences is Z2 (Z≠1) at the angle Y2 in the target direction. Therefore, the target directions that cannot be distinguished in FIG. 5 can be distinguished using the difference of the phase differences.

A ratio f1/f2 (=λ2/λ1) of the first frequency f1 (wavelength λ1) and the second frequency f2 (wavelength λ2) used in the illustrative embodiment is up to about 1.2. Herein, f1>f2. Also, the interval d between the receiving antennas used in the illustrative embodiment is up to twice as long as the wavelength (2×λ2). In this case, when the target direction is +90° or −90°, an absolute value of the difference of the phase differences is as follows.

$$360° \times \left( \frac{d \sin 90°}{\lambda 1} - \frac{d \sin 90°}{\lambda 2} \right) = 360° \times d \times \left( \frac{1}{\lambda 1} - \frac{1}{\lambda 2} \right) \quad \text{[Equation 1]}$$
$$\leq 360° \times 2 \times \lambda 2 \times \left( \frac{1.2}{\lambda 2} - \frac{1}{\lambda 2} \right)$$
$$= 144°$$

In the meantime, the absolute value of the difference of the phase differences is greatest when the target direction is +90° or −90°. That is, herein, the difference of the phase differences is within the range from −180° to +180°. However, when there occurs a difference in the number of folding times of the phase difference of the two frequencies, a case where the difference of the phase differences seems to exceed the range from −180° to +180° may occur. When the difference of the phase differences exceeds the range from −180° to +180°, +360° or −360° is added to the difference of the phase differences so that the difference of the phase differences is to be within the range from −180° to +180°. In the graph of the difference of the phase differences of FIG. 7, the difference of the phase differences is made to be within the range from −180° to +180°. The ranges of the target direction in which the difference of the phase differences exceeds the range from −180° to +180° are regions A and B in FIG. 6, for example.

Figure 8:
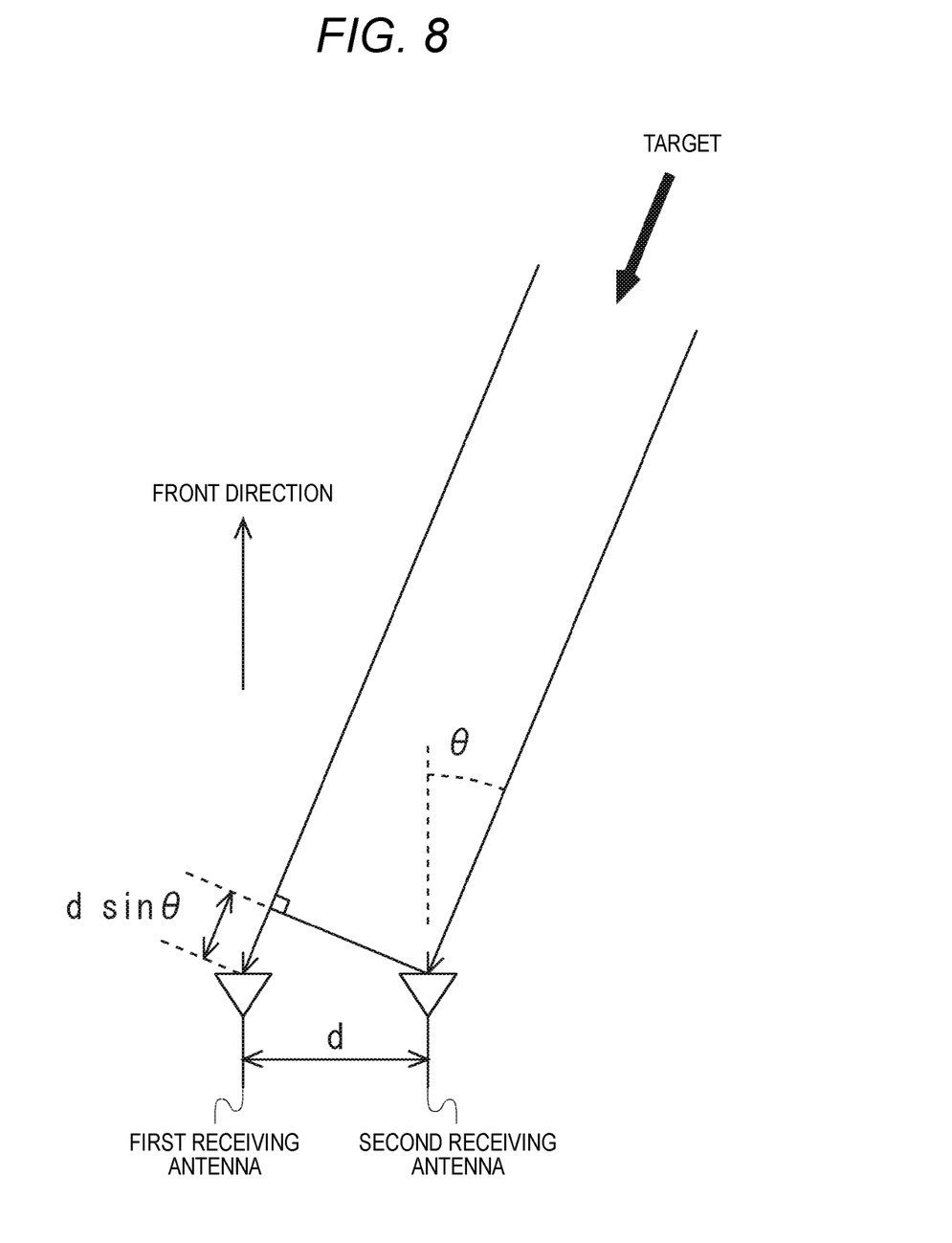
FIG. 8 depicts an example of a path length difference.

FIG. 8 depicts an example of the path length difference. In the example of FIG. 8, the interval between the first receiving antenna 6 and the second receiving antenna is d, and the target exists in a direction of an angle θ. In this case, the path length difference between the target and the respective receiving antennas is d×sin θ.

In S108, the control unit 4 determines the folding of the phase difference. The control unit 4 obtains candidates for the target direction from a relation (refer to FIG. 5) between the target direction and the phase difference of the received signals between the receiving antennas, in the frequency of the received signal. For example, it is assumed that the phase difference (calculated in S103) of the received signals of the frequency (the average frequency of the high frequency region) f2 between the receiving antennas is Z. From the relation of FIG. 5, the candidate for the target direction is the angle Y1 or the angle Y2. Then, the control unit 4 determines the target direction from a relation between the target direction and the difference of the phase differences (calculated in S107). Herein, when the difference of the phase differences is closer to Z2 than Z1, the target direction is the angle Y2. Also, when the difference of the phase differences is closer to Z1 than Z2, the target direction is the angle Y1. Referring to FIG. 5, it can be seen that when the target direction is the angle Y1, the folding of the phase difference has not occurred and when the target direction is the angle Y2, the folding of the phase difference has occurred. In this way, the control unit 4 determines the folding of the phase difference. The relation between the target direction and the phase difference of the received signals between the receiving antennas and the relation between the target direction and the difference of the phase differences are calculated in advance from the distance between the receiving antennas, the frequency of the received signal and the like and are stored in the memory of the control unit 4, for example.

(Modified Embodiment)

A modified embodiment of the operation of the radar device 10 of the illustrative embodiment is described. In the above-described operation example, the radar device 10 transmits the chirp waves. However, in a modified embodiment, the radar device 10 is configured to transmit the transmission signal of the first frequency f1 and the transmission signal of the second frequency f2 (<f1). The radar device 10 is configured to receive reflected waves, which are obtained as the respective transmission signals are reflected on the target, at the respective receiving antennas and to calculate phase differences between the transmission signals and the received signals at each receiving antenna. The difference of the phase differences of the same transmission signal is the phase difference between the first receiving antenna 6 and the second receiving antenna 7. The radar device 10 is configured to determine the folding of the phase by a difference (difference of the phase differences) between the phase difference by the signal of the first frequency f1 and the phase difference by the signal of the second frequency f2.

The radar device 10 is configured to generate the transmission signal of the first frequency f1 and the transmission signal of the second frequency f2 and to transmit the same through the transmission antenna 2. A waveform of the transmission signal is a sinusoidal wave, for example. The transmission waves transmitted from the transmission antenna 2 are reflected by the target around the radar device 10. The radar device 10 is configured to receive the electromagnetic waves (reflected waves) reflected from the target at the first receiving antenna 6 and the second receiving antenna 7. The receiving MMIC 5 is configured to generate signals by mixing the reflected waves (received waves) received at the respective receiving antennas with the transmission waves. A phase difference between the transmission wave and the received wave depends on an amplitude of the mixed signal. The receiving MMIC 5 is configured to AD (Analog to Digital) convert the mixed signals and to output the converted signals to the control unit 4.

Figure 9:
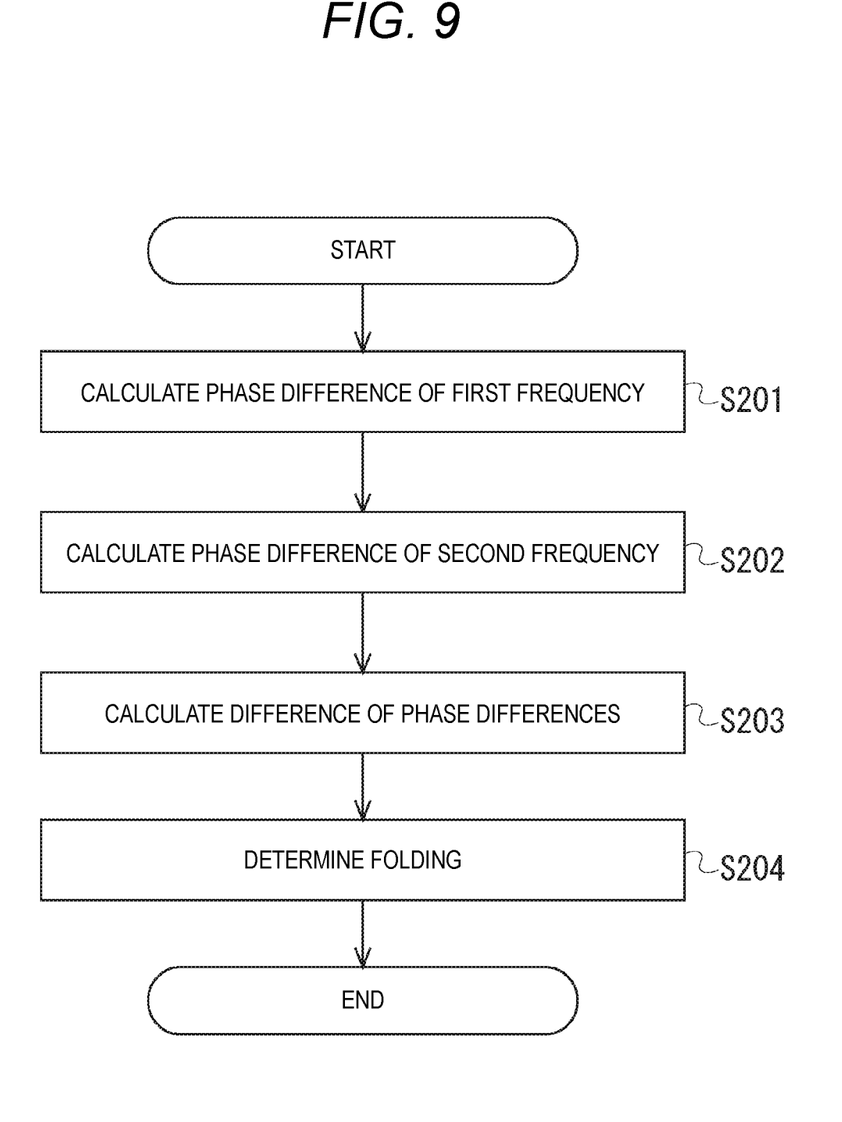
FIG. 9 depicts a modified embodiment of the operation flow of the phase folding determination in the control unit.

FIG. 9 depicts a modified embodiment of the operation flow of the phase folding determination in the control unit. The operation flow of FIG. 9 starts when the control unit 4 receives from the receiving MMIC 5 the signals obtained from the reflected waves received at the respective receiving antennas.

In S201, the control unit 4 calculates a phase difference between the receiving antennas resulting from the received signals of the first frequency. The control unit 4 calculates the phase difference between the receiving antennas resulting from the received signals of the second frequency, based on the signals output from the receiving MMIC 5. The signals output from the control unit 4 have the information of the phase differences between the transmission signals and the received signals of the respective receiving antennas. Therefore, it is possible to calculate the phase difference between the receiving antennas by using the signals.

In S202, likewise, the control unit 4 calculates a phase difference between the receiving antennas resulting from the received signals of the second frequency. The control unit 4 calculates the phase difference between the receiving antennas resulting from the received signals of the second frequency, based on the signals output from the receiving MMIC 5.

In S203, the control unit 4 calculates a difference of the phase differences. The control unit 4 calculates a difference between the phase difference by the received signals of the first frequency f1 calculated in S201 and the phase difference by the received signals of the second frequency f2 calculated in S106.

In S204, the control unit 4 determines the folding of the phase difference. The control unit 4 obtains candidates for the target direction from the relation (refer to FIG. 5) between the target direction and the phase difference of the received signals between the receiving antennas, in the frequency of the received signal. For example, it is assumed that the phase difference (calculated in S201) of the received signals of the second frequency f2 between the receiving antennas is Z. From the relation of FIG. 5, the candidate for the target direction is the angle Y1 or the angle Y2. Then, the control unit 4 determines the target direction from a relation between the target direction and the difference of the phase differences (calculated in S202). Herein, when the difference of the phase differences is closer to Z2 than Z1, the target direction is the angle Y2. Also, when the difference of the phase differences is closer to Z1 than Z2, the target direction is the angle Y1. Referring to FIG. 5, it can be seen that when the target direction is the angle Y1, the folding of the phase difference has not occurred and when the target direction is the angle Y2, the folding of the phase difference has occurred. In this way, the control unit 4 determines the folding of the phase difference.

(Operations and Effects of Illustrative Embodiment)

An operation example of the radar device 10 of the illustrative embodiment is described. Herein, the radar device 10 transmits the predetermined transmission signals, receives the reflected waves reflected on the target at the respective receiving antennas, and generates the signal based on the transmission signals and the received signals. The radar device 10 calculates the phase difference at the first receiving antenna 6 and the phase difference at the second receiving antenna 7 for each transmission signal. The radar device 10 calculates the phase differences between the first receiving antenna 6 and the second receiving antenna 7, in the signal by the high frequency and in the signal by the low frequency. Also, the radar device 10 determines the folding of the phase by the difference (difference of the phase differences) between the phase difference of the signal by the high frequency and the phase difference of the signal by the low frequency.

According to the radar device 10, since it is possible to make the interval between the first receiving antenna 6 and the second receiving antenna 7 greater than the wavelength of the transmission signal, it is possible to prevent the deterioration in performance of the receiving antennas upon the determination of the folding.

According to the radar device 10, it is possible to determine the folding of the phase difference by using one transmission antenna 2 and the frequency difference of the transmission signals of at least two frequencies. Also, according to the radar device 10, it is possible to precisely estimate an arrival direction of the signal from the target without making the interval between the receiving antennas equal to or smaller than the wavelength of the transmission frequency so that the folding of the phase difference is not to occur.

According to the radar device 10, it is possible to determine the folding of the phase difference by using the signals in the two regions of the high region (high frequency region) and low region (low frequency region) of the transmission signal of the FCM or FMCW.

<Computer-Readable Recording Medium>

A program for enabling a computer and other machines and apparatuses (hereinafter, referred to as computer and the like) to implement any one of the above functions can be recorded in recording media that can be read by the computer and the like. The computer and the like are enabled to read and execute the program recorded in the recording media, so that the corresponding function can be provided.

Herein, the recording media that can be read by the computer and the like indicate recording media configured to accumulate therein information such as data and program and to read the same from the computer and the like by an electrical, magnetic, optical, mechanical or chemical action. In the recording media, elements configuring the computer, such as a CPU, a memory and the like, may be provided and the CPU may be enabled to execute the program.

Also, a medium, which can be removed from the computer and the like, of the recording media includes a flexible disk, a magneto optical disk, a CD-ROM, a CD-R/W, a DVD, a DAT, a 8 mm tape, a memory card and the like.

Also, a hard disk, a ROM and the like can be exemplified as a recording medium fixed to the computer and the like.

What is claimed is:

1. A radar device comprising:
   a transmitter comprising a transmission antenna which is configured to transmit chirp waves of which a frequency continuously changes;
   a receiver comprising a first receiving antenna and a second receiving antenna which are configured to receive signals obtained by bouncing the chirp waves off a target, and to generate beat signals from the chirp waves and the received signals; and
   a processor programmed to determine folding of a first phase difference between a first signal of the beat signals corresponding to a high region side of the chirp waves received by the first receiving antenna, and the first signal of the beat signals corresponding to the high region side of the chirp waves received by the second receiving antenna, based on:
   the first phase difference,
   a second phase difference between a second signal of the beat signals corresponding to a low region side of the chirp waves received by the first receiving antenna, and the second signal of the beat signals corresponding to the low region side of the chirp waves received by the second receiving antenna, and
   a difference between the first phase difference and the second phase difference.

2. A method of determining phase difference folding, the method comprising, by a radar device configured to transmit and receive signals of a predetermined frequency:
   transmitting chirp waves of which a frequency continuously changes;
   receiving, with a first receiving antenna and a second receiving antenna, signals obtained by bouncing the chirp waves off a target, and generating beat signals from the chirp waves and the received signals; and
   determining folding of a first phase difference between a first signal of the beat signals corresponding to a high region side of the chirp waves received by the first receiving antenna, and the first signal of the beat signals corresponding to the high region side of the chirp waves received by the second receiving antenna, based on:
   the first phase difference,
   a second phase difference between a second signal of the beat signals corresponding to a low region side of the chirp waves received by the first receiving antenna, and the second signal of the beat signals corresponding to the low region side of the chirp waves received by the second receiving antenna, and
   a difference between the first phase difference and the second phase difference.

* * * * *